(12) United States Patent
Seo et al.

(10) Patent No.: US 9,941,719 B2
(45) Date of Patent: Apr. 10, 2018

(54) WIRELESS CHARGING SURFACE

(71) Applicant: International Business Machines Corporation, Armonk, NY (US)

(72) Inventors: Hyun K. Seo, Austin, TX (US); Edouard A. Urcadez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 94 days.

(21) Appl. No.: 15/158,004

(22) Filed: May 18, 2016

(65) Prior Publication Data

US 2017/0338677 A1    Nov. 23, 2017

(51) Int. Cl.
    *H02J 7/00*      (2006.01)
    *H02J 7/02*      (2016.01)
    *H05B 33/08*     (2006.01)

(52) U.S. Cl.
    CPC .......... *H02J 7/0047* (2013.01); *H02J 7/0068* (2013.01); *H02J 7/025* (2013.01); *H05B 33/0803* (2013.01)

(58) Field of Classification Search
    CPC ........ H02J 7/0047; H02J 7/025; H02J 7/0068; H05B 33/0803
    USPC .......................................................... 307/19
    See application file for complete search history.

(56) References Cited

U.S. PATENT DOCUMENTS

| | | | | |
|---|---|---|---|---|
| 2008/0258679 | A1* | 10/2008 | Manico | H02J 50/10 320/106 |
| 2014/0265998 | A1* | 9/2014 | Nielson | H02J 7/0047 320/101 |
| 2014/0266025 | A1 | 9/2014 | Jakubowski | |
| 2015/0188357 | A1 | 7/2015 | Chen et al. | |
| 2015/0295447 | A1 | 10/2015 | Nitz | |

FOREIGN PATENT DOCUMENTS

| | | |
|---|---|---|
| EP | 2066001 A2 | 6/2009 |
| EP | 2683054 A2 | 1/2014 |
| WO | 2012169861 A2 | 12/2012 |
| WO | 2015157309 A1 | 10/2015 |

OTHER PUBLICATIONS

Wu, Peng, et al. "Use of Frequency-Selective Surface for Suppressing Radio-Frequency Interference from Wireless Charging Pads." IEEE Transactions on 61.8 (2014): 3969-3977.
Hui, S. Y. "Planar wireless charging technology for portable electronic products and Qi." Proceedings of the IEEE 101.6 (2013): 1290-1301.

* cited by examiner

*Primary Examiner* — Carlos Amaya
*Assistant Examiner* — Win Htun

(57) ABSTRACT

A surface with various layers that provide wireless charging may include at least one of a top surface layer, a second layer, comprising a plurality of lights and a power grid, disposed under the top surface layer, a charging pad disposed on a portion of the power grid, and a third layer, comprising a power supply which provides power to the plurality of lights and the power grid, disposed under the second layer.

23 Claims, 7 Drawing Sheets

200

WIRELESS CHARGING SURFACE

TECHNICAL FIELD

This application relates to an electrical charging surface and more particularly to any common surface, such as a surface with multiple layers for accommodating an electronic device power supply via wireless power charging techniques.

BACKGROUND

A surface to place objects permits an individual to utilize the surface to perform various tasks. Over the years, the increase in power supplied to electronic devices operating on the surface or near the surface has increased substantially. The power supplied to computers, phones, printers, lamps and other common surface top items usually includes cords laid across the surface which decreases the amount of surface space available for other activities.

SUMMARY

One example embodiment may include an apparatus with at least one of a top surface layer, a second layer including a plurality of light sources and a power grid disposed under the top surface layer, a charging pad disposed on a portion of the electrical power grid, and a third layer including a power supply which provides power to the plurality of light sources and the power grid disposed under the second layer.

Another example embodiment may include an apparatus with at least one of a plurality of lights disposed on a power grid, a plurality of nodes each providing power, at least one wireless charging pad affixed to a sub-section of the plurality of nodes, the sub-section comprising a portion of the plurality of node, a power source which provides the power to each of the plurality of nodes, and an uninterrupted power supply (UPS) connected to the power source and configured to provide power when the power source loses power.

DETAILED DESCRIPTION

It will be readily understood that the instant components, as generally described and illustrated in the figures herein, may be arranged and designed in a wide variety of different configurations. Thus, the following detailed description of the embodiments of at least one of a method, apparatus, and system, as represented in the attached figures, is not intended to limit the scope of the application as claimed, but is merely representative of selected embodiments.

The instant features, structures, or characteristics as described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" may have been used in the description of embodiments, the application may be applied to many types of network data, such as, packet, frame, datagram, etc. The term "message" also includes packet, frame, datagram, and any equivalents thereof. Furthermore, while certain types of messages and signaling may be depicted in exemplary embodiments they are not limited to a certain type of message, and the application is not limited to a certain type of signaling.

Example embodiments provide a wireless charging surface for a device to rest against and receive a wireless charging current. In general, users have a plethora of cords/cables that powers various devices situated on or near any common resting surface, such as a surface. Throughout the disclosure, the word "surface" is referred to as any type of resting surface which may contact or come within close contact of an electronic device requiring a charge. The term surface may be used interchangeably and/or referred to as a desk or other types of apparatus, such as a table, counter, shelf, wall, ceiling, floor, rotating surface, moving surface, mat, seat, window, frame, door, board, counter, deck, machine, kiosk, bar, etc. The surface could also be a portable item that can be moved from one location to another.

Such devices which can be charged on the surface may include laptops, desktop computers, display monitors, printers, speakers, tablets, smartphones, wearable electronics, etc. The surface of the present disclosure is a surface that integrates multiple wireless charging pads to charge/power devices. The pads can be laid in any configuration on the charging grid based on a user preference.

Figure 1:
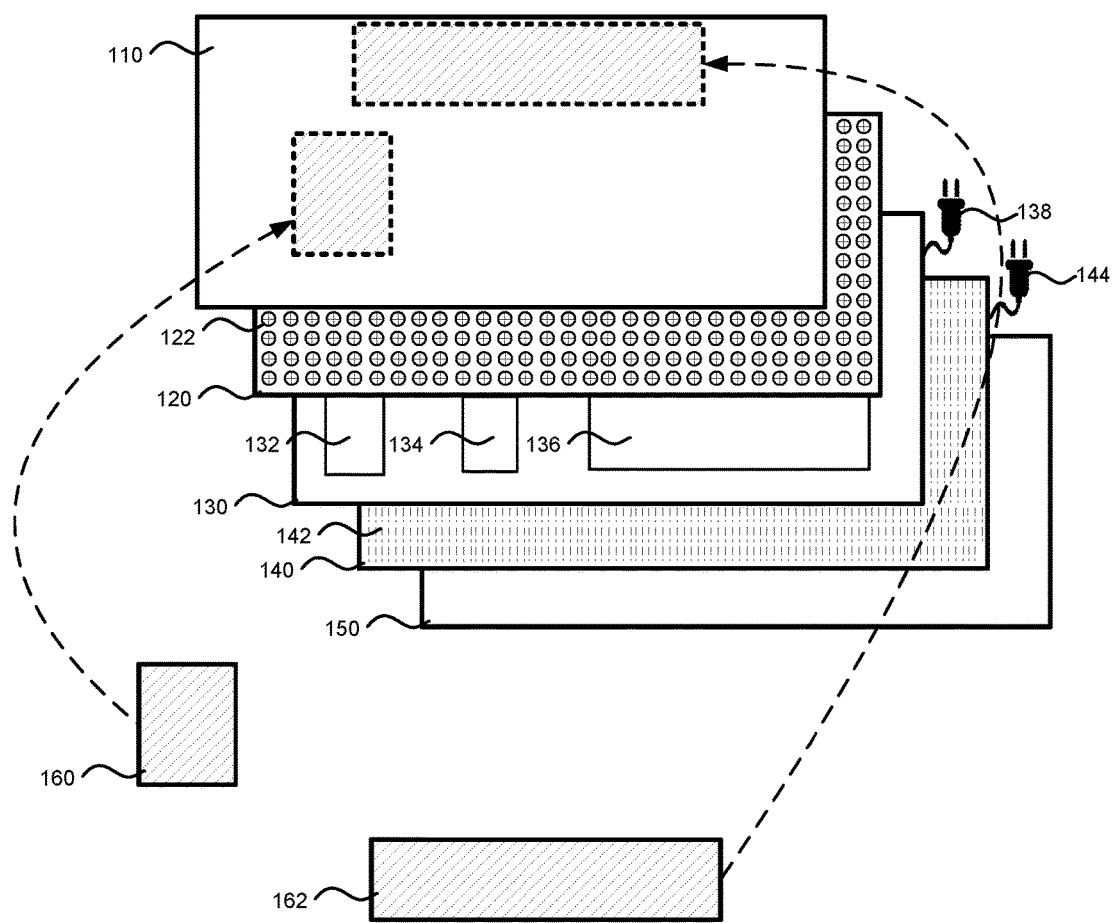
FIG. 1 illustrates an exploded view of a surface and corresponding surface layers according to an example embodiment.

FIG. 1 illustrates an exploded view of a surface and corresponding surface layers according to an example embodiment. Referring to FIG. 1, the surface configuration 100 may include a number of layers 110, 120, 130, 140 and 150. In other embodiments, more or less layers may also be used. For example, the top layer 110 may be a relatively smooth surface with a transparent or semi-transparent surface permitting the light from a plurality of light sources, such as light emitting diodes (LEDs), incandescent, fluorescent, high-intensity discharge, included in the layer 120 to be visible to a user attempting to charge a device wirelessly.

A modular configuration provides a way to integrate multiple charging wires and LEDs to charge a device in numerous locations on a particular surface area of the surface. The multiple charging wires may accommodate varying amperage voltage requirements of the various devices. The smart surface has the capability to accept modular wireless charging pads or other charging device such as 160 and 162. These charging devices can re-charge and/or power devices via wireless charging capabilities and/or accept auxiliary backup power via a battery source as an uninterrupted power supply 136 which can operate when auxiliary power sources are unavailable. The second layer 120 includes one or more lights, such as LEDs 122 (or a grid of lights) which may also have an integrated power array to provide wireless charging power to any portion of a surface area of the charging surface.

The grid of lights and/or power grid may be considered a grid of nodes used to attach wireless variable-voltage charging pads or other devices of all sizes. These pads permit a user to directly charge devices capable of wireless charging or with a wireless charging adapter. The grid of nodes may be considered a combination of any one of a light source, a power providing conduit and a fitting to attach or snap-in a portion of the charging pad. Each node may provide a fixed amount of power to the charging pad. In order to notify the user of available charging areas, the lights can illuminate according to the area(s) of modular charging pads 160, 162 permitting the user to view the status of the charging performed by the charging pads. The lights may change color to indicate they are, non-inclusively, at least one of: not in a correct area, underpowered, errored, off/disabled, available for charge, and charged. The power/electricity can also be optionally backed-up by a rechargeable battery that can be integrated into the surface.

The surface can be managed by a web-interface or local network interface from a client device connected to the same local network. When the surface is not plugged into an outlet, the designated user device is notified by a notification and/or an alert. Since the UPS 136 is handling the power distribution to the charging devices, any devices that are being powered or which are recharging may be lowered to a minimum amperage to charge the device for a prolonged battery life while not wasting the limited available power of the UPS 136.

The grid nodes can be powered and/or used for attaching/securing the charging pads via a fastening mechanism in each node. The powered nodes can provide electricity to the pads and support the position of the modular charging pads. The wireless charging pad voltage and amperage can either be controlled/overridden manually via a web-service application (not shown) on the device that will be charged, such as for dumb/legacy wireless charging devices. Further, an auto-configured charging function may be applied using a BLUETOOH and/or an NFC coupling procedure. Each wireless charging pad 160, 162 may have an E-INK display that auto-assigns a unique number in order for the user of the surface to identify different unique charging pads, as well as a LED to indicate the power level. The wireless charging pad can also integrate NFC and/or BLUETOOTH which can couple/tether with a device with NFC and/or BLUETOOTH to confirm/match the configuration of the power output of the wireless charging pad in order to start charging/powering without damaging the device.

The user may have the ability to override the 'hand-shake' setup procedure which normally requires user input or confirmation prior to establishing a charging session. The wireless charging pad 160/162, depending on its size, can power a single device or multiple devices. The layout, voltage, amperage, etc., can be viewed in real-time or near real-time on the web-service application in order for the user to view/confirm the layout as well as permitting the user to configure the setup options.

The third layer 130 may have a plug 138 that is used to plug the surface into a wall outlet for a continued power source. The third layer may house the UPS 136, a power source 134 and a computing module 132 as a controller to control the charging, the lights, etc.

The fourth layer 140 may also have a plug 144 that provides the conduits 142 with power to power the components of the third layer and/or the grid nodes 122 of the second layer 120. A fifth layer 150 is a back cover which serves to protect to the bottom portion of the surface.

Figure 2:
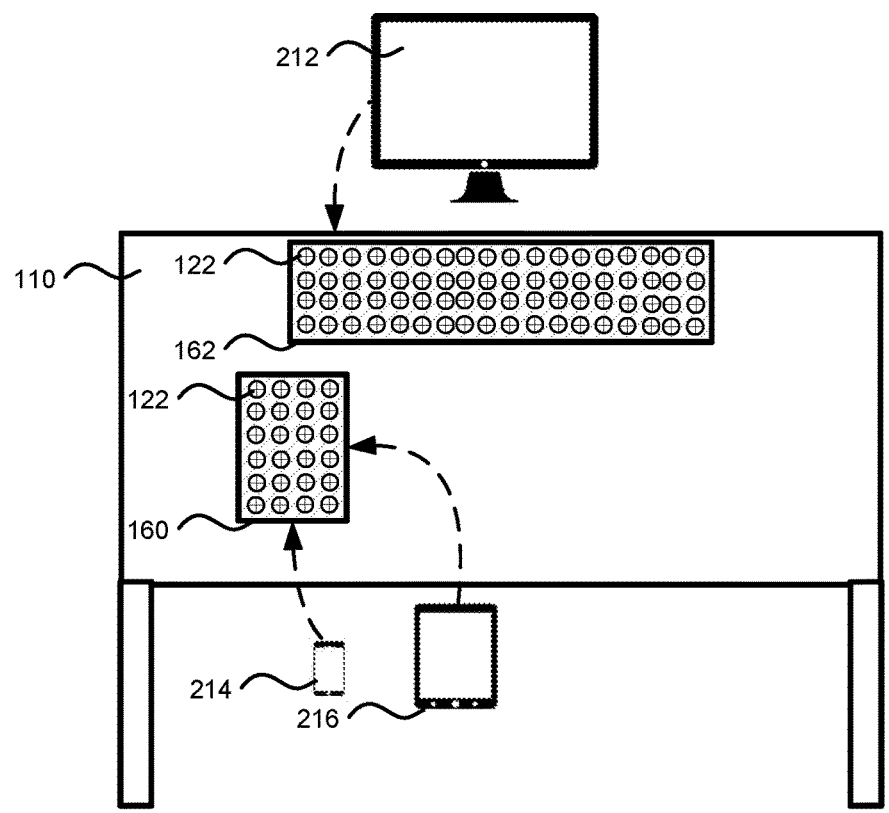
FIG. 2 illustrates a surface top view of charging pads and corresponding devices requiring electrical charge according to an example embodiment.

FIG. 2 illustrates a top view perspective of the charging pads and corresponding devices requiring electrical charge according to an example embodiment. Referring to FIG. 2, the top view of the surface 200 may include the top surface layer 110 with multiple devices 212, 214 and 216 resting thereon each of which may require charge to operate. The example charging pads 160, 162 may be disposed on the second layer 120 and may be viewable via the transparent or semi-transparent top layer 110 of the surface. Once the pads are in position, the lights may change color, dim capacity, flash, etc., to indicate the pads are ready to charge one or more devices.

In one example, a user has a compatible charge-ready device. The user may select a sub-region of surface area to place the wireless charging pad(s) on a desired location underneath the working surface of the top surface and directly on the grid layer 120. The user may access either the web-interface or the application connected to the surface's computing module or web server to configure the newly placed charging pads 160, 162. In other embodiments, the newly placed charging pads 160, 162 can automatically be configured based on communication directly or indirectly between the pads and the application. The user may set an "automatic handshake" with a BLUETOOTH or NFC charging component and see an outline of the lights indicating that the portion of the surface is now available to power and/or charge devices. The user can place a device on the general area of the charging pad(s) and the light indication may indicate that the device is charging by automatic synchronization of voltage/amperage data exchange via NFC or other protocol.

In another example, a user may have a legacy wireless charging device. The user may place the wireless charging pad on a preferred location underneath the working surface of the surface of the grid layer 120 which can be pulled out or otherwise electronically extended similar to a surface extension via a rolling mechanism or other movement configuration. The user can access either the web-interface or application connected to the surface computing module or web server interface to configure the newly placed charging pad. The user can then select the device that will be charged via various profiles that can be pre-configured. The user can then see an outline, color, indication of lights indicating that the portion of the surface with the charging pad is now available to power and/or recharge devices. The user can place an electronic device on the general area of the light indication and the device begins charging by automatic synchronization of voltage/amperage data exchange via NFC or another known wireless charging protocols and technologies.

In another example, the user may use the devices powered by the surface when the power outlet is no longer functioning due to a power outage. The surface backup power supply 136 may initiate operation and the user's devices can still be powered and/or charging, although at a slower rate and with limited power available from the battery. The user is notified of this limited power situation and can be provided with various data via numerous communications, such as a notification in the application, an email and/or SMS message. The battery life meter or other information may be provided to the user interface to indicate the amount of battery power available.

Figure 3:
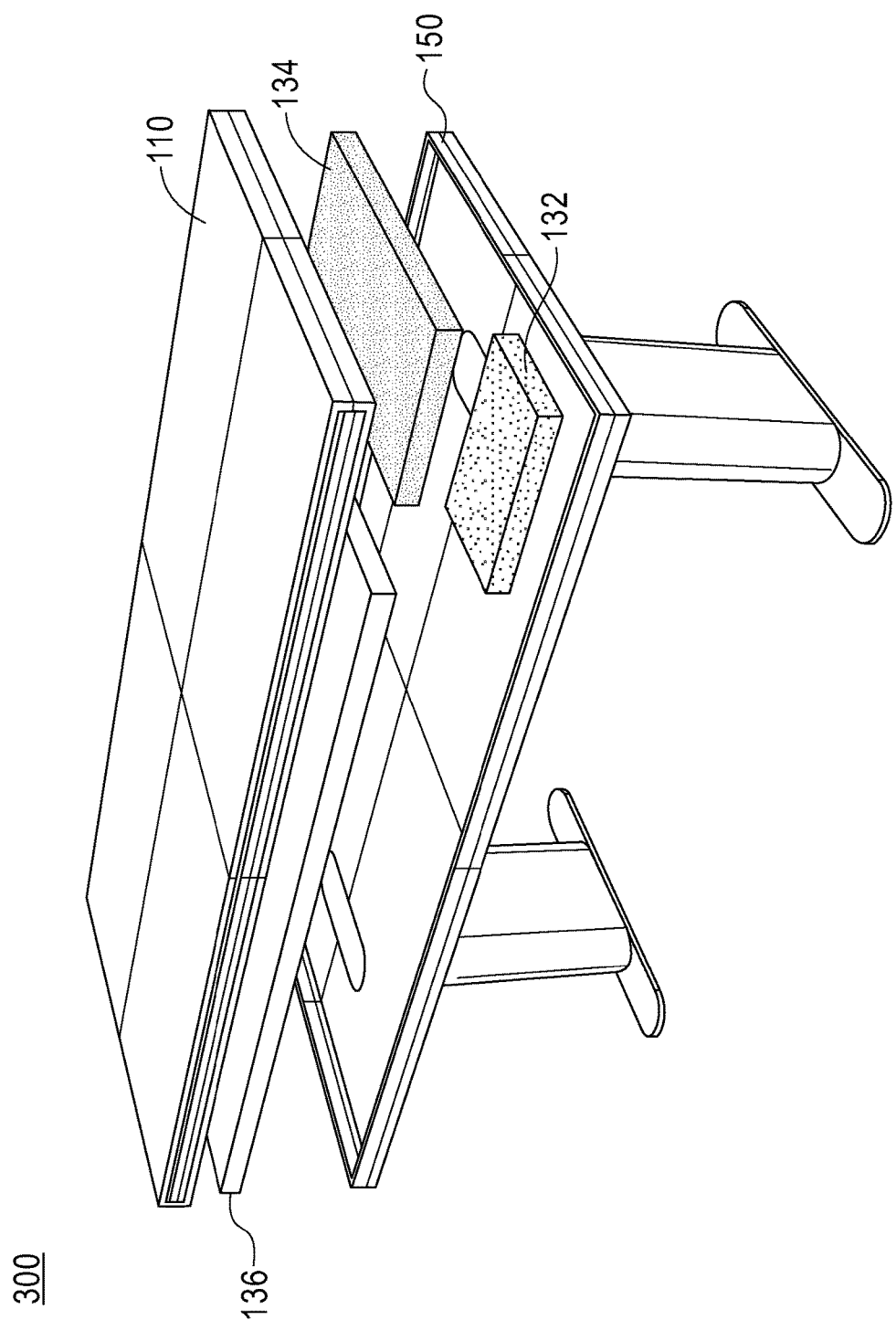
FIG. 3 illustrates another exploded view of the surface layers according to an example embodiment.

FIG. 3 illustrates another exploded view of the surface layers according to an example embodiment. Referring to FIG. 3, the surface 300 is illustrated as having a top surface 110 with a set of modular sections above a lower portion of the surface 150. The larger components embedded inside the surface cavity include a UPS 136, a computing module 132 and a power supply 134. The grid of nodes may be positioned directly inside the top portion 110 as a pull-out section enabling a user to customize the locations of the wireless charging pads.

Figure 4:
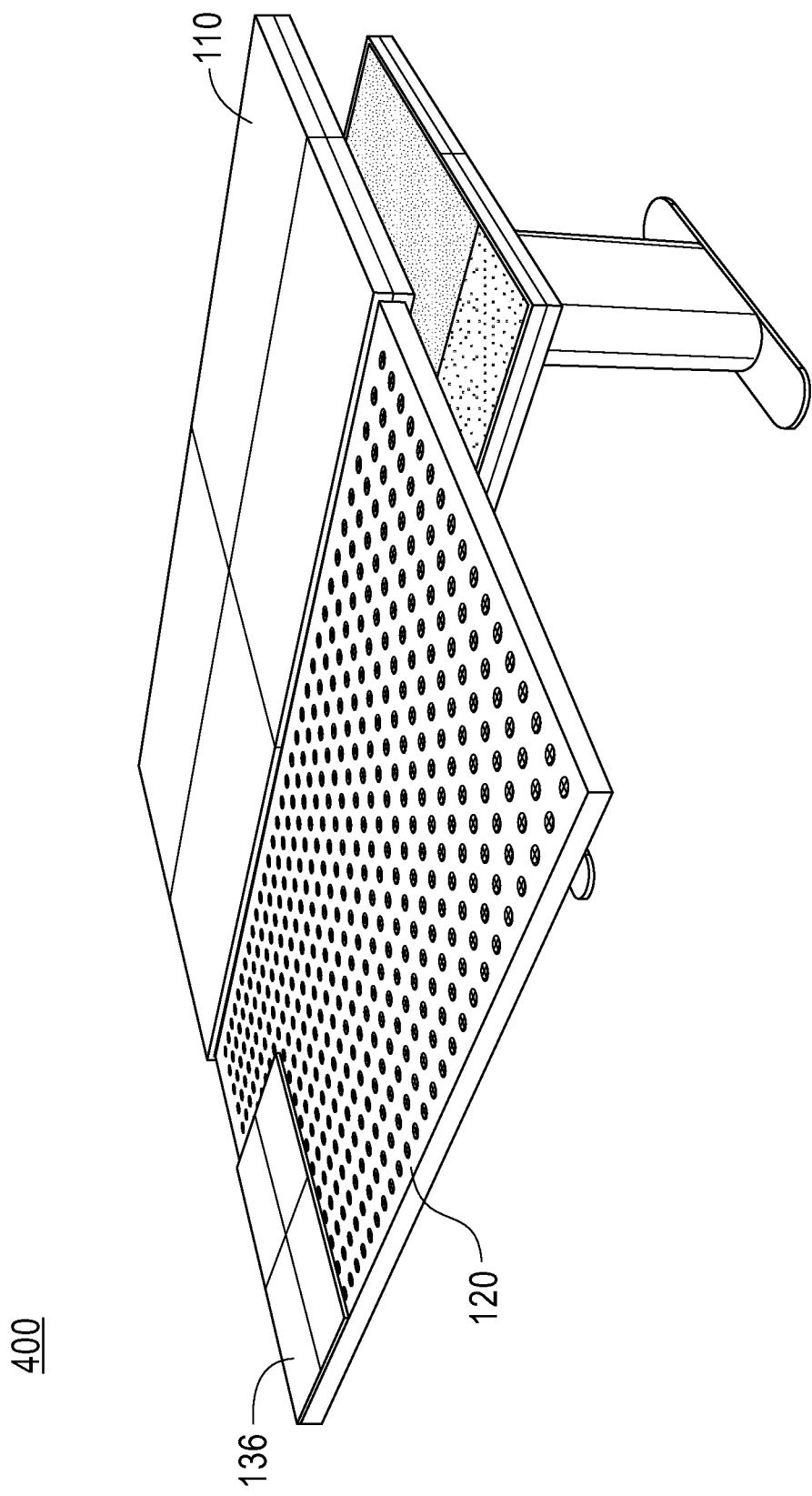
FIG. 4 illustrates a view of a top layer and the light source and power grid layer with a charging pad according to an example embodiment.

FIG. 4 illustrates a view of the top layer and the lights and a charging power grid layer with a charging pad according to an example embodiment. Referring to FIG. 4, the configuration 400 includes the grid 120 having been partially removed or extended from the surface top portion 110 and a charging pad 160 having been placed at one corner of the grid array.

Figure 5:
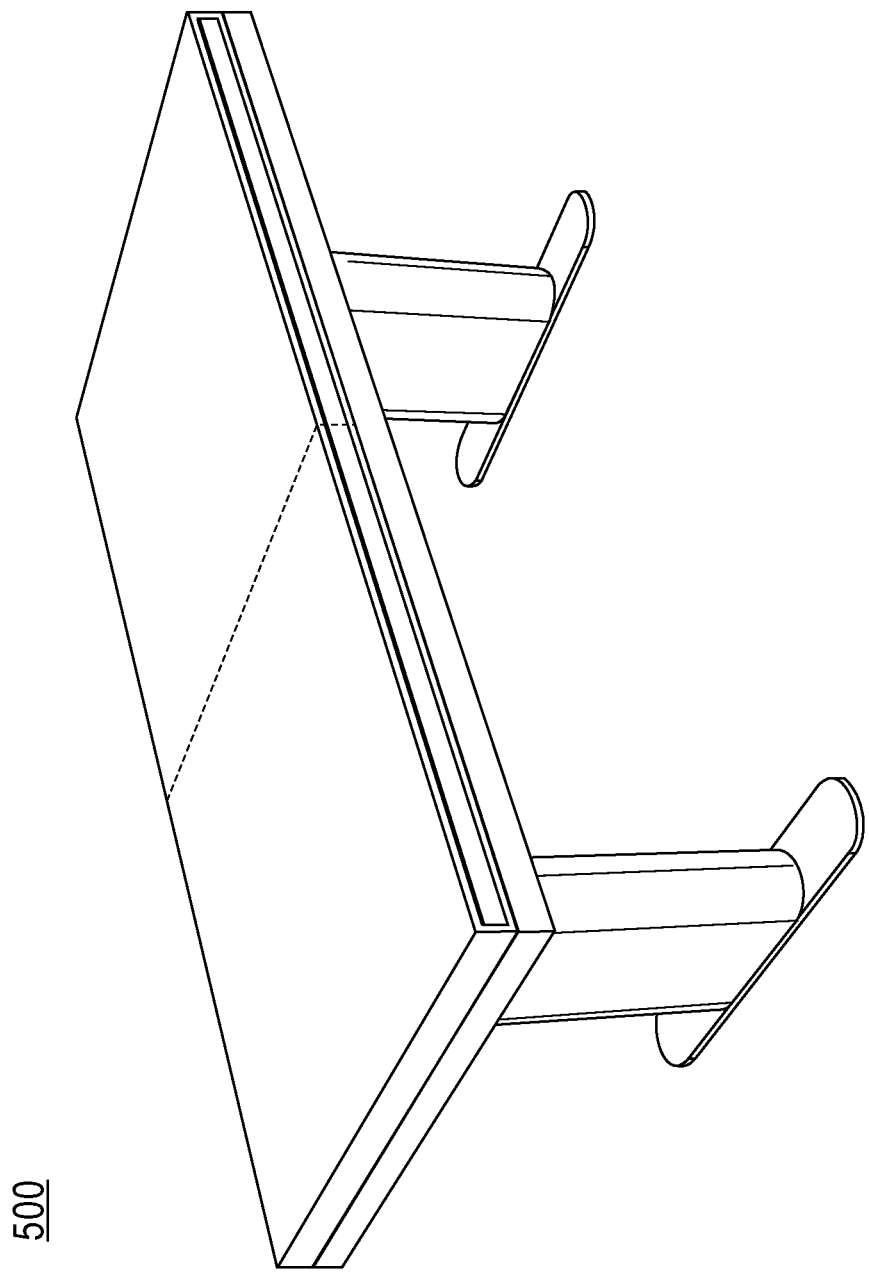
FIG. 5 illustrates a view of the surface according to an example embodiment.

FIG. 5 illustrates a view of the surface 500 according to an example embodiment. Referring to FIG. 5, the top of the surface 110 is shown in a normal working manner. The top layer or a portion of the top layer may be transparent or semi-transparent to permit the charging pad and lights to be visible to the user. The charging grid will require a RF or electrical permeable surface so the charge can reach the device disposed above the charging pad. In one embodiment, the charging pad will not make physical contact with the devices to be charged as the top layer is disposed between the pad and the device, however, the charge can still reach the device in the event that the material of the top surface permits the RF permeable transmission of charge signals.

Figure 6:
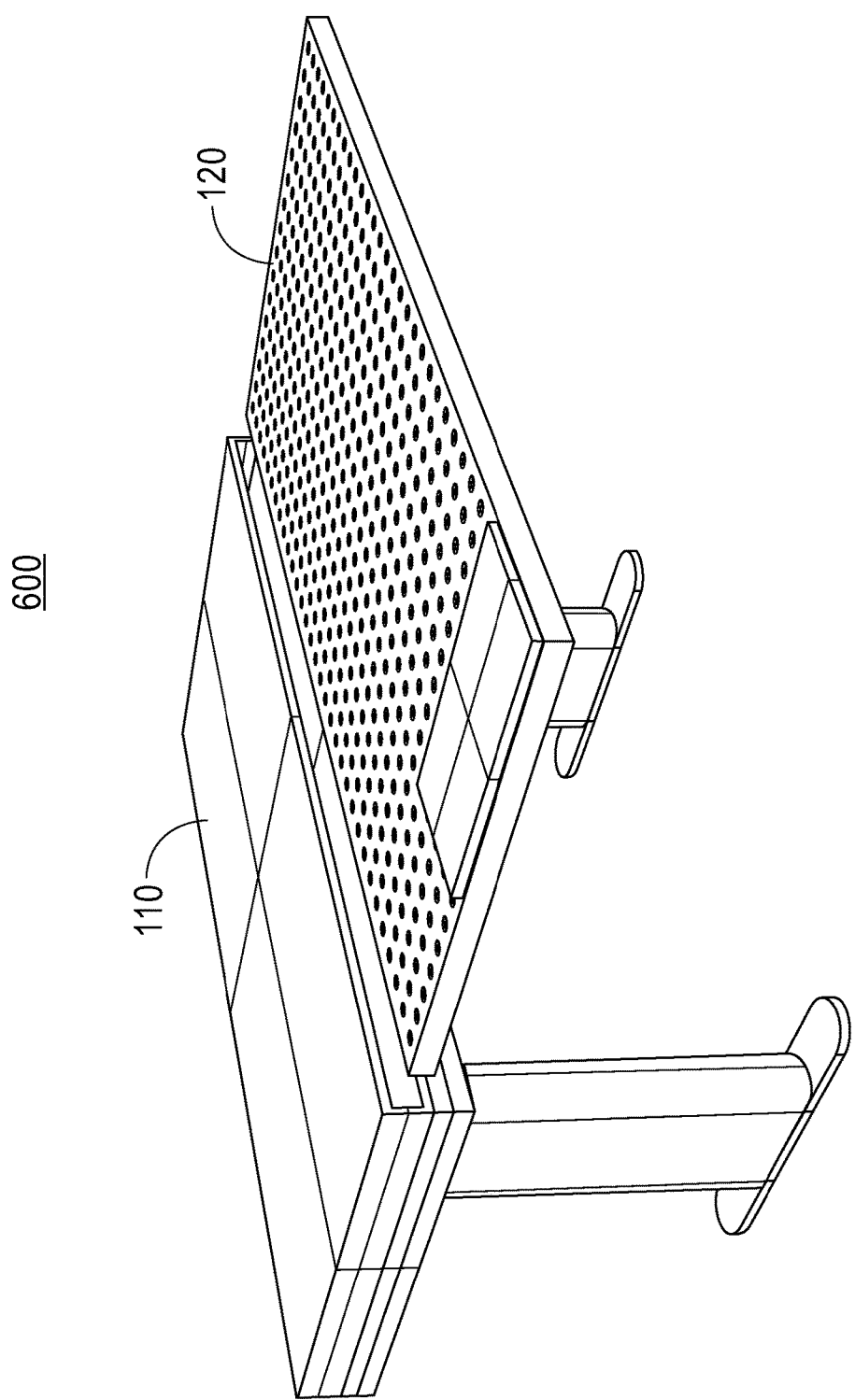
FIG. 6 illustrates a side view of the top layer and the LED and power grid layer with a charging pad according to an example embodiment.

FIG. 6 illustrates a side view of the top layer and the LED and charging power grid layer with a charging pad according to an example embodiment. The example view of FIG. 6 is similar to FIG. 5, however, the entire layer 120 is removed or extended from the surface to illustrate the transportability of the charging layer 120.

One example method of operation may include providing a charging surface with switchable components including a grid of lights, a set of wireless charging pads, a power connector, a rechargeable battery, and a computing module capable of receiving user configuration commands controlling device access to the wireless powering system. Layering the grid of lights beneath the charging surface, and interlocking the switchable components forming the charging surface provides a total surface surface area for a potential charging platform.

One example device configuration may include an apparatus with a top surface layer, a second layer including a plurality of lights and a plurality of electrical powered wires (or grid) disposed under the top surface layer, a charging pad disposed on at least a portion of the grid, and a third layer including a power supply which provides power to the plurality of LEDs and the plurality of charging wires disposed under the second layer.

The third layer can be connected to the second layer via at least one conduit which provides power to the LEDs and the charging wires via a wired power source. The second layer may receive a plurality of removable wireless charging pads disposed on sub-sections of a surface area of the second layer. The third layer further includes an uninterrupted power supply (UPS) and a computing module configured to control the power supplied to the plurality of wireless charging pads. The computing module is configured to change a color of the lights to indicate at least one of charging, not charging, error charging, etc. The color, intensity, pattern of the lights may change in an area covered by the at least one charging pad. The fourth layer includes a plurality of conduits providing power to the UPS, the power supply and the computing module of the third layer, the fourth layer is disposed under the third layer.

The above embodiments may be implemented in hardware, in a computer program executed by a processor, in firmware, or in a combination of the above. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 7 illustrates an example network element 700, which may represent or be integrated in any of the above-described components, etc.

Figure 7:
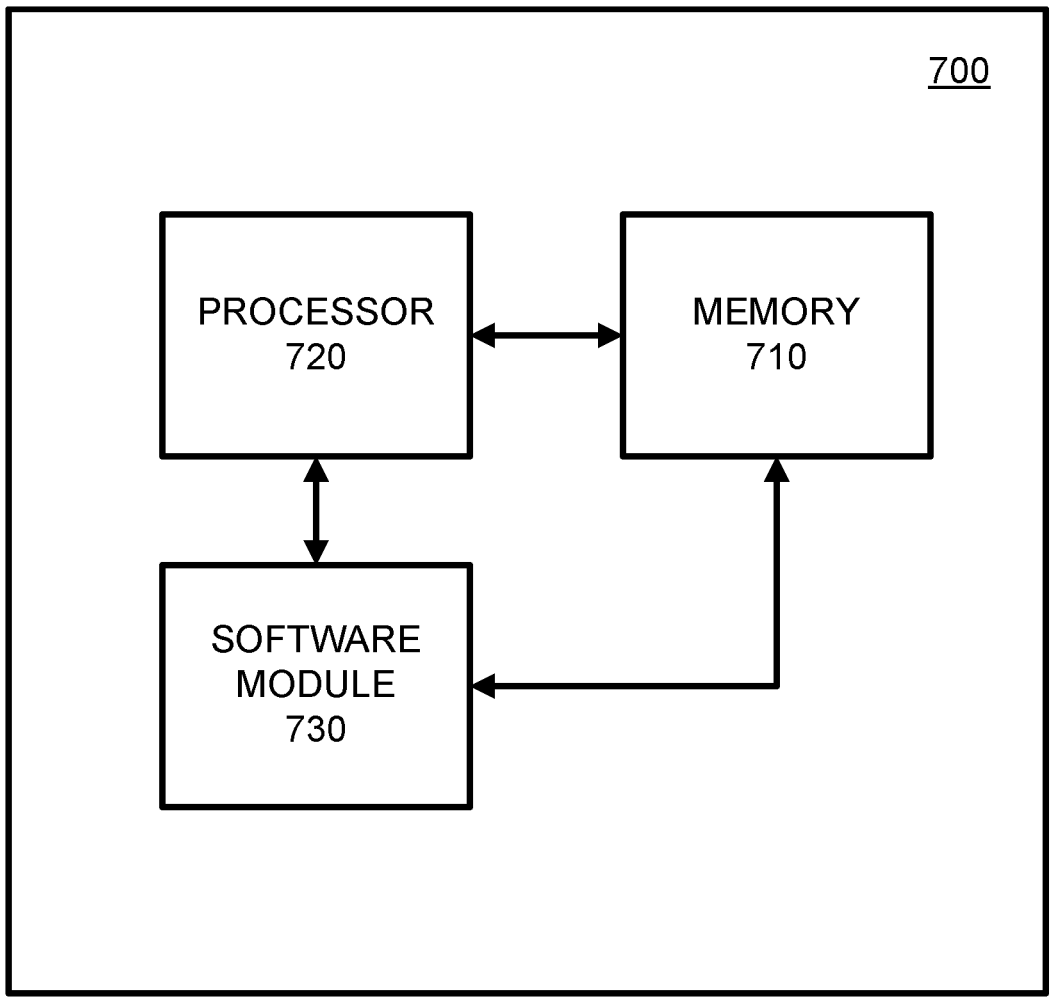
FIG. 7 illustrates an example computing module included in the layers of the surface according to an example embodiment.

As illustrated in FIG. 7, a memory 710 and a processor 720 may be discrete components of a network entity 700 that are used to execute an application or set of operations as described herein. The application may be coded in software in a computer language understood by the processor 720, and stored in a computer readable medium, such as, a memory 710. The computer readable medium may be a non-transitory computer readable medium that includes tangible hardware components, such as memory, that can store software. Furthermore, a software module 730 may be another discrete entity that is part of the network entity 700, and which contains software instructions that may be executed by the processor 720 to effectuate one or more of the functions described herein. In addition to the above noted components of the network entity 700, the network entity 700 may also have a transmitter and receiver pair configured to receive and transmit communication signals (not shown).

Although an exemplary embodiment of at least one of a system, method, and non-transitory computer readable medium has been illustrated in the accompanied drawings and described in the foregoing detailed description, it will be understood that the application is not limited to the embodiments disclosed, but is capable of numerous rearrangements, modifications, and substitutions as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. An apparatus, comprising:
   a top surface layer;
   an intermediate layer comprising a plurality of lights and power grid, and which is disposed under the top surface layer;
   one or more modular charging pads disposed at one or more portions of the power grid, wherein the power grid is configured to receive the one or more modular charging pads at dynamic locations and supply power to the one or more modular charging pads at the dynamic locations thereby dynamically configuring wireless charging locations of the top surface layer; and
   a lower layer comprising a power supply which provides power to the plurality of lights and the power grid, and which is disposed under the intermediate layer.

2. The apparatus of claim 1, wherein the lower layer is connected to the intermediate layer via at least one conduit which provides power to the plurality of lights and the power grid via a wired power source.

3. The apparatus of claim 1, wherein the one or more modular charging pads comprise a plurality of removable wireless charging pads disposed on sub-sections of a surface area of the intermediate layer.

4. The apparatus of claim 3, wherein the lower layer further comprises an uninterrupted power supply (UPS) and a computing module configured to control the power supplied to the plurality of removable wireless charging pads.

5. The apparatus of claim 4, wherein the computing module is configured to change a color of the lights to indicate at least one of charging, not charging, and error charging.

6. The apparatus of claim 5, wherein the color of the lights changes in an area covered by a charging pad.

7. The apparatus of claim 4, further comprising a fourth layer comprising a plurality of conduits that provide power to the UPS, the power supply and the computing module of the lower layer, the fourth layer being disposed under the lower layer.

8. The apparatus of claim 1, wherein the plurality of lights comprise a plurality of light emitting diodes (LEDs).

9. The apparatus of claim 8, wherein the top surface layer is transparent and permits the light from the plurality of LEDs to be visible.

10. The apparatus of claim 1, wherein the power grid comprises a plurality of nodes that each provide a fixed amount of voltage to the charging pad.

11. An apparatus, comprising:
    a plurality of lights disposed on a power grid;
    a plurality of nodes disposed on the power grid that each provide power;
    one or more modular wireless charging pads affixed to one or more subsections of the plurality of nodes, wherein the plurality of nodes are configured to receive the one or more modular charging pads at dynamic locations and supply power to the one or more modular charging pads at the dynamic locations thereby dynamically configuring wireless charging locations;

a power source which provides the power to each of the plurality of nodes; and an uninterrupted power supply connected to the power source and configured to provide power when the power source loses power.

12. The apparatus of claim 11, further comprising at least one conduit which provides power to the plurality of lights and the power grid via a wired power source.

13. The apparatus of claim 11, wherein the one or more modular charging pads comprise a plurality of removable wireless charging pads disposed on the power grid.

14. The apparatus of claim 13, further comprising a computing module configured to control the power supplied to the plurality of removable wireless charging pads.

15. The apparatus of claim 14, wherein the computing module is configured to change a color of the plurality of lights to indicate at least one of charging, not charging, and error charging.

16. The apparatus of claim 15, wherein the color of the lights changes in an area covered by the charging pad.

17. The apparatus of claim 14, further comprising a plurality of conduits that provide power to the uninterrupted power supply, the power supply and the computing module of the third layer.

18. The apparatus of claim 11, wherein the plurality of lights comprise a plurality of light emitting diodes (LEDs).

19. The apparatus of claim 18, further comprising a transparent surface layer disposed over the power grid that permits the light from the plurality of LEDs to be visible.

20. The apparatus of claim 11, wherein the power of each of the plurality of nodes is a fixed amount of voltage.

21. The apparatus of claim 1, wherein the intermediate layer of the apparatus is movable with respect to the top layer of the apparatus thereby enabling the intermediate layer to be separated from the top surface.

22. The apparatus of claim 1, wherein the power grid comprises a distributed network of attachment nodes exposed on a top surface of the intermediate layer which enable the one or more modular charging pads to be attached at dynamic locations on the power grid.

23. The apparatus of claim 1, further comprising a computing module configured to power on at least one light from among the plurality of lights to indicate a wireless charging location of the one or more modular charging pads prior to a charge receiving device being placed on the top surface of the apparatus.

* * * * *